United States Patent
Rosenberg

(10) Patent No.: US 7,313,607 B1
(45) Date of Patent: Dec. 25, 2007

(54) METHOD AND APPARATUS OF HIERARCHICAL NODE PARTITIONING FOR ADDRESS PLANNING IN PNNI NETWORKS

(75) Inventor: Eric Rosenberg, Lincroft, NJ (US)

(73) Assignee: AT&T Corp., New York, NY (US)

( * ) Notice: Subject to any disclaimer, the term of this patent is extended or adjusted under 35 U.S.C. 154(b) by 934 days.

(21) Appl. No.: 10/748,942

(22) Filed: Dec. 29, 2003

Related U.S. Application Data

(60) Provisional application No. 60/472,361, filed on May 21, 2003.

(51) Int. Cl.
*G06F 13/00* (2006.01)
(52) U.S. Cl. .................. 709/220; 709/225; 709/245
(58) Field of Classification Search ........... 709/220, 709/223, 225, 238, 245
See application file for complete search history.

(56) References Cited

U.S. PATENT DOCUMENTS 6,333,918 B1* 12/2001 Hummel ................ 370/238
6,690,653 B1* 2/2004 Anbiah et al. ............ 370/256
6,724,881 B1* 4/2004 McAllister et al. ..... 379/220.01
7,120,681 B2* 10/2006 Frelechoux et al. ........ 709/221

OTHER PUBLICATIONS

Iliadis, et al., "PNNI Clustering Under Node Mobility in ATM Networks," Global Telecommunication Conf. 1998, GLOSECOM 98, The Bridge to Global Integration, IEEE, vol. 1, 1998, p. 613-620.
Jaffe, J., "Hierarchical Clustering with Topology Databases," Computer Networks and ISDN Systems 15 (1988) 329-339.
Kim, et al., "Scalable domain partitioning in Internet ISPF routing," Telecommunication Systems 15 (2000)113-127.
Van Mieghem, P., "Dividing a Network into Peer Groups to Build a Hierarchical Structure," Proceedings of First International Workshop on the Design of Reliable Communications Networks (DNCN 98), May 17-20, Brugge, O16, 1-4.

* cited by examiner

*Primary Examiner*—Viet D. Vu

(57) ABSTRACT

Method and apparatus for hierarchical node partitioning for address planning in networks, e.g., PNNI ATM networks to perform judicious definition of peer groups to create a logical partitioning of the ATM switches that increases PNNI routing efficiency and performance.

20 Claims, 3 Drawing Sheets

DCC AESA Format

| AFI | DCC | High Order - Domain Specific Part | End System Identifier | SEL |

←— IDI —→✗←————————— Domain Specific Part —————————→

ICD AESA Format

| AFI | ICD | High Order - Domain Specific Part | End System Identifier | SEL |

←— IDI —→✗←————————— Domain Specific Part —————————→

E.164 AESA Format

| AFI | E.164 | HO-DSP | End System Identifier | SEL |

←———— IDI ————→✗←———— Domain Specific Part ————→

Local AESA Format

| AFI | High Order - Domain Specific Part | End System Identifier | SEL |

←————————————— Domain Specific Part —————————————→

FIG. 1

METHOD AND APPARATUS OF HIERARCHICAL NODE PARTITIONING FOR ADDRESS PLANNING IN PNNI NETWORKS

This application claims the benefit of U.S. Provisional Application No. 60/472,361 filed on May 21, 2003, which is herein incorporated by reference.

The present invention relates generally to communication networks and, more particularly, to a method and apparatus of effectively performing hierarchical node partitioning in an ATM PNNI network using ATM End System Address.

BACKGROUND OF THE INVENTION

In the PNNI routing and signaling protocol for ATM networks, switching nodes are organized into logical peer groups. Each node in a peer group has full details of the topology of that peer group, but only summary knowledge of the topology of other peer groups. Each ATM node requires a 160 bit address, called the ATM end system address (AESA), defined by the ATM Forum. All nodes in a given peer group have, for some value of k, where $0<=k<=104$, identical values of the first k bits in their node AESAs. This value of k is called the PNNI level indicator. Judicious definition of peer groups and their corresponding level of PNNI hierarchy can create a logical partitioning of the ATM switches that increases PNNI routing efficiency and performance. A peer group with more than one node can itself be partitioned, leading to a tree representation of the hierarchies. When designing a hierarchy, nodes are often assigned to peer groups to form geographic clusters. If the hierarchy is not appropriately defined, changing it may require changing the AESA, which results in a temporary loss of service to customers. This leads to the problem of node partitioning to support both a current view of the hierarchy as well as possible future creation of both lower level and higher level peer groups.

Therefore, a need exists for a method and apparatus to effectively design hierarchical node partitions in a PNNI network using ATM End System Addresses (AESAs).

SUMMARY OF THE INVENTION

In one embodiment, the present invention is a recursive method for creating a hierarchical partitioning of a set N of nodes in the plane and defining corresponding bit strings for the nodes. The bit string can be used to define the AESA, which in general contains other non-hierarchical information (e.g., which of the several possible AESA formats is being used). The partitioning is recursive: the first partitioning of N creates two sets N_0 and N_1; the partitioning method is then applied to both N_0 and N_1, and so on, until there are no more sets to partition (each node is in its own partition).

Since the present invention partitions each set into exactly two pieces in one embodiment, the present invention can associate a bit string with each node in the set to be partitioned. Initially, before any partitioning has occurred, each bit in the bit string is initialized to the value zero. When the set of nodes represented by a given string is partitioned, the present invention assigns a 0 or 1 to the address string starting with the most significant bit first toward the least significant bit of the address string one bit at a time, to indicate the subdivision into two sets. When the partitioning halts, no two nodes will have an identical bit string. The required length of the bit string is $L=ceiling(log\ 2|N|)$, where $|N|$ is the number of nodes in the set N and ceiling(x) is the smallest integer not less than x.

Using this method, the present invention can create AESAs that will support the efficient use of PNNI routing as the number of switches in the network increases. At some network size, it is worthwhile creating a two level hierarchy. At some yet larger size, the present invention can easily split one or both of the lowest level peer groups and so on, up to L levels. This ability to scale requires a carefully designed address plan.

This method differs from other methods in that the present invention only requires knowledge of switch locations and uses no link (e.g., trunk) information. This is advantageous since in practice the universe of potential switch locations is relatively easy to generate, while the set of trunks changes significantly as the network grows. Moreover, for a network that will grow, the present invention must create an addressing plan that includes locations that do not even have a switch yet, but may in the near future.

BRIEF DESCRIPTION OF THE DRAWINGS

The teaching of the present invention can be readily understood by considering the following detailed description in conjunction with the accompanying drawings, in which:

FIG. 1 illustrates a diagram of 4 types of AESAs defined by the ATM Forum;

To facilitate understanding, identical reference numerals have been used, where possible, to designate identical elements that are common to the figures.

DETAILED DESCRIPTION

Figure 2:
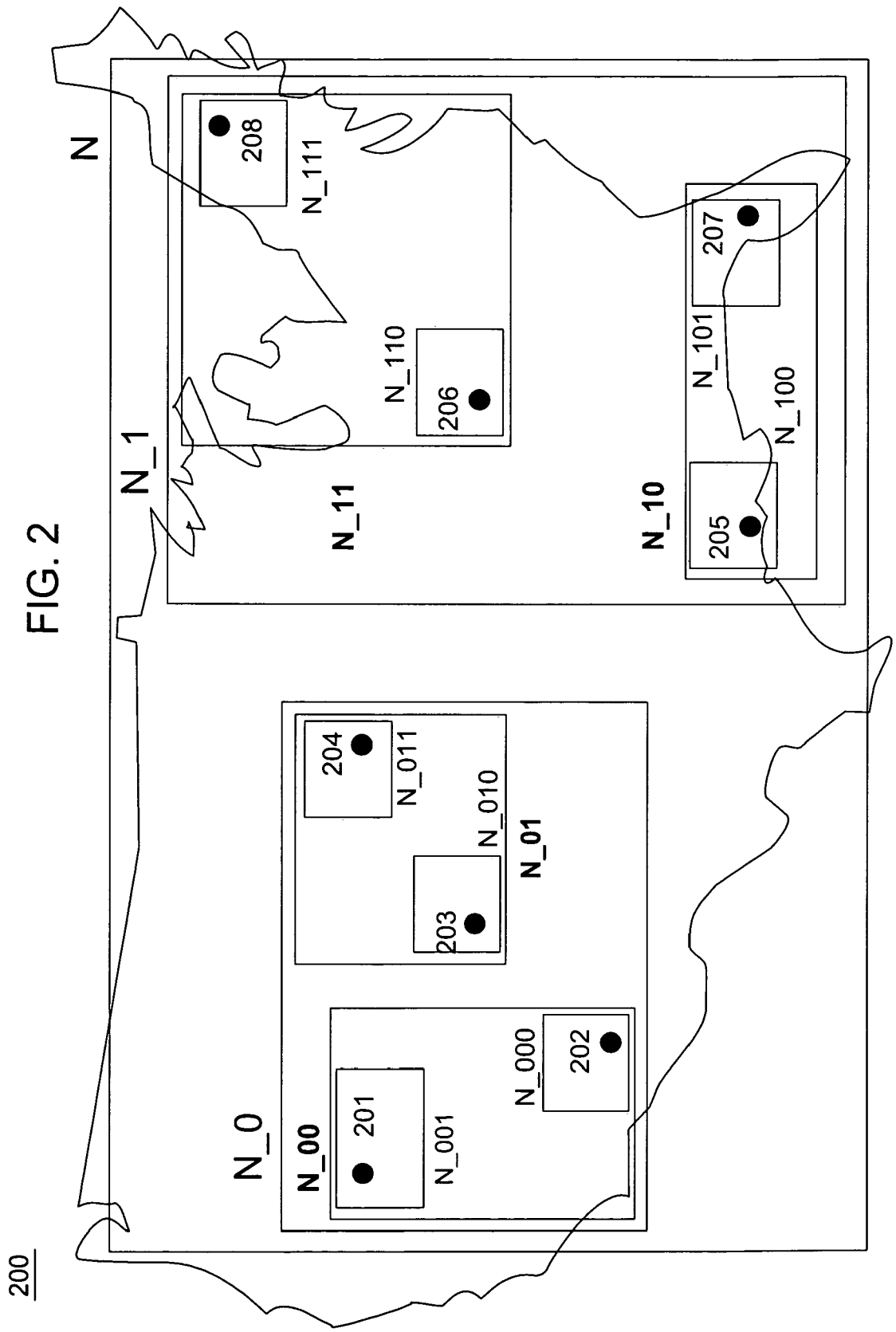
FIG. 2 illustrates a block diagram of a communication network comprising a plurality of nodes.

The present invention relates to data communication networks. These networks include, but are not limited to, Asynchronous Transfer Mode (ATM) networks.

In an ATM network, each node requires a 160 bit address, called the ATM end system address (AESA), defined by ATM Forum. Three types of AESA used in specifications UNI 3.1, UNI Signaling 4.0, ILMI 4.0, PNNI version 1.0, etc., are shown in FIG. 1. The local AESA can be used for private purposes. The fields defined by the ATM Forum specifications are:

AFI: Authority and Format Indicator. The value of this field determines the type of the AESA (e.g., DCC, ICD, E.164, Local) and also indicates what authority can assign codes (the structure and values of fields) in the rest of the AESA.

DCC: Data Country Code. This type of AESA is assigned by ISO to national authorities (each country has a unique DCC code value). For AESAs using the DCC format, each country is free to decide the structure and rules for assignment of the Domain Specific Part (bytes 4-20). The AFI for a DCC is 39 and the value of the DCC field indicates the country.

ICD: International Code Designator. An ICD is intended for use in the construction of internationally recognized codes. For AESAs using the ICD format, each ICD code point assignee is free to decide the structure and rules used for assignment of the Domain Specific Part (bytes 4-20). The AFI for an ICD is 47 and the value of the ICD field indicates to which code set or organization that particular ICD is assigned.

E.164: An E.164 AESA can be constructed by populating the Initial Domain Identifier of the AESA with a valid E.164 address. The AFI for an E.164 AESA is 45.

IDI: Initial Domain Identifier. The contents of this field vary depending on the value of the AFI. For example, with a DCC AESA (AFI=39), the IDI value of 0x840F identifies the United States.

HO-DSP: High-Order Domain Specific Part. This field has meaning as defined by the address authority controlling the AESA and its delegate. This component (together with the AFI and IDI) is typically used within the network to identify a peer group.

ESI: End-System Identifier. The ESI is usually an IEEE 802.2 Media Access Control (MAC) address.

SEL: Selector. The selector is not used for ATM routing, but may be used by end systems.

All nodes in a given peer group have, for some value of k, where $0<=k<=104$, identical values of the first k bits in their node AESAs. This value of k is called the PNNI level indicator. Judicious definition of peer groups and their corresponding level indicators can create a logical partitioning of the ATM switches that increases PNNI routing efficiency and performance. A peer group with more than one node can itself be partitioned, leading to a tree representation of the hierarchies. A given physical switch can contain multiple nodes, where each node operates at a different level of the PNNI hierarchy.

In practice, certain fields, such as the AFI field, IDI field, and part of the HO-DSP field, of the first 13 octets (104 bits) of the AESA are assigned by and registered with national or international authorities, depending on the AESA type used, responsible for address assignments. Therefore, only a subset of the lower order bits of the HO-DSP field can be freely assigned by a user or a network operator. The number of lower order bits that can be freely assigned by a user or a network operator varies depending on the AESA type used as well. The present invention addresses how those remaining lower order freely assignable k bits within HO-DSP field, where $0<k<=104$, can be partitioned to design peer groups that increases PNNI routing and efficiency and performance.

When designing a hierarchy, nodes are often assigned to peer groups to form geographic clusters. For example, Africa and Europe might be two large peer groups in the partitioning of a worldwide network. If both the Africa and Europe peer groups have the same PNNI level indicator with a string of k bits in length, then all node AESAs in Africa have the same first k bits, and similarly for Europe, but the first k bits in Africa and Europe are not identical. Additionally, within Africa the present invention might, for example, require all nodes in the same country to have the same first q bits, where $k<q<=104$. Even if the present invention currently chooses to not have a separate peer group for each country in Africa, the AESA should nonetheless be defined to allow this additional partitioning, in case it is desired later (for example, if the number of switches in Africa grows substantially). If the AESA is not appropriately defined, changing it requires temporarily downing the node, resulting in a loss of service to customers. This leads to the problem of defining AESAs to support both a current view of the hierarchy as well as possible future creation of both lower level and higher level peer groups.

To address this criticality, the present invention provides a method and apparatus of effective hierarchical node partitioning for ATM address planning in an ATM network.

Although the present invention applies to ATM Private Network to Network Interface (PNNI) networks using AESA, those skilled in the art will realize the present invention can be adapted, with suitable modifications and extensions, to Frame Relay and optical switch networks as well. Similar extensions are possible for Internet Protocol (IP)/MPLS networks.

To better understand the present invention, a description of the components of such communication networks is provided below. FIG. 2 shows an exemplary communication network 200 of the present invention. The communication network 200 comprises a plurality of nodes 201-208.

The coordinates of each node are shown in Table 1.

TABLE 1

| Node | x-coordinate | y-coordinate |
|------|--------------|--------------|
| 201  | 1            | 4            |
| 202  | 2            | 2            |
| 203  | 3            | 3            |
| 204  | 4            | 4            |
| 205  | 5            | 1            |
| 206  | 6            | 3            |
| 207  | 7            | 1            |
| 208  | 8            | 6            |

Considering the problem of partitioning a set N of nodes in the plane using FIG. 2, a partition based on geographic proximity may be used. For example, to partition the example set of all the ATM switches, nodes 201-208, in the United States, the present invention might first take N_0 and N_1 to be the set of switches in the east and the west, respectively. The set N_0 contains nodes 201-204, and the set N_1 contains nodes 205-208. This creates a one level hierarchy. Then N_0 might be further partitioned into the east and the west again, N_00 and N_01 respectively, where N_00 contains nodes 201-202, and N_01=N_0−N_00 contains nodes 203-204. Furthermore, N_1 might be further partitioned into the north and the south, N_11 and N_10 respectively, where N_11 contains nodes 206 and 208, and N_10=N_1−N_11 contains nodes 205 and 207. This creates a two level hierarchy.

Figure 3:
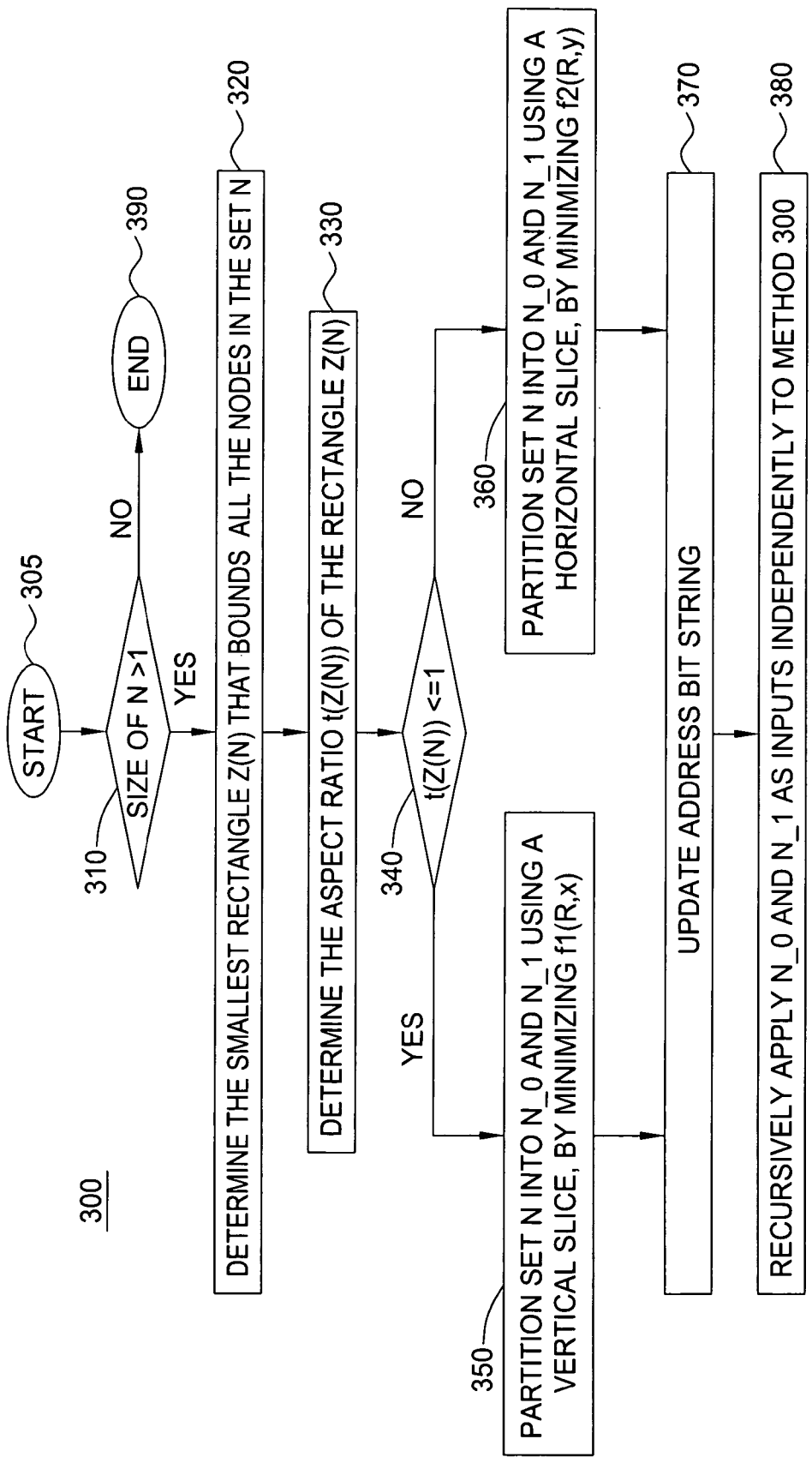
FIG. 3 illustrates a flowchart of the present invention for creating hierarchical ATM addresses by recursive partitioning of the set of nodes.

FIG. 3 illustrates a flowchart of the partitioning method 300 for creating hierarchical ATM addresses by recursive partitioning of the set of nodes. Method 300 starts in step 305 and proceeds to step 310.

In step 310, the method will check if the size of N is greater than 1. If the size is equal to 1, the current thread of the method terminates in step 390. If the size is greater than 1, then the current thread of the method will proceed to step 320. Size is defined as the number of nodes in set N.

In step 320, the smallest bounding outline, e.g., a rectangle, Z(N), that bounds all nodes in set N will be defined. The current set N of nodes to be partitioned lies in a rectangle R with sides parallel to the x and y axes. In this method, a "node" need not represent a physical switch or higher level PNNI node. It could also represent, e.g., a state capitol, if the present invention wants to partition the 48 states in the continental U.S.

Let (x,y) be the coordinates of a node in set N. Let the lower left coordinate of R be (xL, yL) and the upper right coordinate be (xH, yH), where xL<xH and yL<yH. Let the i-th node in N have coordinates (x(i), y(i)), so $xL<=x(i)<=xH$ and $yL<=y(i)<=yH$ for all i in N. For simplicity the present invention assumes that all coordinates are integer valued, but the present invention is not so limited. In practice this is easily accomplished by defining a smaller unit of measurement. The present invention also assumes that no two nodes share the same (x,y) coordinates.

Let
$xL_0$=min of x(i) where {i in N}
$yL_0$=min of y(i) where {i in N}
$xH_0$=max of x(i) where {i in N}
$yH_0$=max of y(i) where {i in N}

Then the rectangle Z(N) whose lower left corner is $(xL_0, yL_0)$ and whose upper right corner is $(xH_0, yH_0)$ is the "rectangular hull" of N, which means that if D is any other rectangle with sides parallel to the x and y axes containing all nodes of N, then D contains Z(N). In particular, Z(N) is contained in the bounding rectangle R.

Once the bounding rectangle Z(N) is defined, the method proceeds to step 330.

In step 330, the method will determine the aspect ratio of the bounding rectangle Z(N). t(Z(N)), the aspect ratio of Z(N), is defined as:

$$t(Z(N)) = (yH_0 - yL_0)/(xH_0 - xL_0)$$

and t is used to represent t(Z(N)) when there is no ambiguity. Once the aspect ratio is defined, the method proceeds to step 340.

In step 340, the method will check if the aspect ratio t(Z(N)) is smaller than or equal to 1. If it is, the method proceeds to step 350; otherwise, it will proceed to step 360.

In step 350, the rectangle Z(N) will be sliced with a line parallel to the y axis. The x coordinate of the slice is chosen to be the point minimizing some appropriately chosen function over the interval [xL, xH]. Specifically, let the function c1(R, x), defined over [xL, xH], be the number of nodes in N that are contained in the rectangle whose lower left coordinate is (xL, yL) and whose upper right coordinate is (x, yH). Let size(Q) be the number of points in the discrete set Q. Define the function f1 by f1(R, x)=|c1(R, x)−size(N)/2|, where |w| is the absolute value of the real number w. Let x* be any integer minimizing f1(R, x) over [xL, xH]. Let the rectangle R_0 have the lower left coordinate (xL, yL) and the upper right coordinate (x*, yH). Let the rectangle R_1 have the lower left coordinate (x*+1, yL) and the upper right coordinate (xH, yH). Let N_0={i in N:(x(i), y(i)) is in R_0} and let N_1=N−N_0. By construction, N is the union of N_0 and N_1, and N_0 and N_1 are disjoint. Moreover, the number of nodes in N_0 and N_1 differ by at most 1 if no two points in R have the same x coordinate. If f1(R, x*)=0 then both N_0 and N_1 contain size(N)/2 nodes. Step 350 will apply even in the degenerate case where $xL_0 < xH_0$ and $yL_0 = yH_0$. Note that the case $xL_0 = xH_0$ and $yL_0 = yH_0$ can never occur, since the present invention never partitions a set with a single node.

In step 360, the rectangle Z(N) will be sliced with a line parallel to the x axis. The y coordinate of the slice is chosen to be any point minimizing some appropriately chosen function over the interval [yL, yH]. Specifically, let the function c2(R,y), defined over [yL, yH], be the number of nodes in N that are contained in the rectangle whose lower left coordinate is (xL, yL) and whose upper right coordinate is (xH, y). Define the function f2 by f2(R, y)=|c2(R, y)−size(N)/2|. Let y* be any integer minimizing f2(R, y) over [yL, yH]. Let the rectangle R_0 have the lower left coordinate (xL, yL) and the upper right coordinate (xH, y*). Let the rectangle R_1 have the lower left coordinate (xL, y*+1) and the upper right coordinate (xH, yH). Define N_0 and N_1 exactly as before. Again, N is the union of N_0 and N_1, sets N_0 and N_1 are disjoint, and the number of nodes in N_0 and N_1 differ by at most 1 if no two points in R have the same y coordinate. If f2(R, y*)=0 then both N_0 and N_1 contain size(N)/2 nodes. Step 360 will apply even in the degenerate case where $xL_0 < xH_0$ and $yL_0 < yH_0$. Note that the case $xL_0 = xH_0$ and $yL_0 = yH_0$ can never occur, since the present invention never partitions a set with a single node.

Upon finishing either step 350 or 360, the method will proceed to step 370. In step 370, having partitioned R into R_0 and R_1 the present invention can now update the address bit string for all nodes in N, as follows. Let s be the current bit string associated with the node n in N. If n is in N_0, the present invention sets the most significant unassigned bit in to "0," while if n is in N_1, the present invention sets the most significant unassigned bit in s to "1." Then in step 380, R_0 and R_1 will be recursively applied as 2 sets of independent inputs to method 300 starting at step 305.

In the current invention, the most significant bit of address string s will be assigned first, then the next most significant bit, and so on, until all L=ceiling(log 2|N|) bits have been assigned. Each call to the recursive procedure assigns a value to the most significant unassigned bit. Initially all unassigned bits of string s will have a value of 0.

Returning to FIG. 2 to further illustrate the present invention using the example network 200, the initial set N contains all nodes 201-208, and the length of the assignable binary address bit string is 3 bits in length.

The size of N is 8 is checked in step 310. An initial smallest bounding rectangle Z(N) that contains the set N is formed in step 320, and then the method proceeds to step 330. The aspect ratio of Z(N) is 5/7 and is checked in step 340 to be smaller than 1, then the method proceeds to step 350. In step 350, f1(R,x) is minimized when x=x*=4. Therefore in step 370, N_0 will contain nodes 201-204 with address string s=000 and N_1 will contain nodes 205-208 with address string s=100. This forms the first level of the hierarchy of network 200.

N_0 will now be applied as input to method 300 recursively and will start at step 305. The size of N_0 is 4, and the method proceeds to step 320 and then to step 330 where t(Z(N_0)) is found to be 2/3. In step 340, since t is smaller than 1, then the method proceeds to step 350. In step 350, f1(R,x) is minimized when x=x*=2. Therefore in step 370, N_00 will contain nodes 201-202 with address string s=000 and N_01 will contain nodes 203-204 with address string s=010.

Similarly and independently, N_1 will be applied as input to method 300 recursively and will start at step 305. The size of N_1 is 4, and the method proceeds to step 320 and then to step 330 where t(Z(N_1)) is found to be 5/3. In step 340, since t is greater than 1, then the method proceeds to step 360. In step 360, f2(R,y) is minimized when y=y*=1. Therefore in step 370, N_10 will contain nodes 205 and 207 with address string s=100 and N_11 will contain nodes 206 and 208 with address string s=110. Now, the second level of the hierarchy has been formed within network 200.

N_00 will now be applied as input to method 300 recursively and will start at step 305. The size of N_00 is 2, and the method proceeds to step 320 and then to step 330 where t(Z(N_00)) is found to be 2. In step 340, since t is greater than 1, then the method proceeds to step 360. In step 360, f2(R,y) is minimized when y=y*=2. Therefore in step 370, N_000 will contain node 202 with address string s=000 and N_001 will contain node 201 with address string s=001.

Similarly and independently, N_01 will be applied as input to method 300 recursively and will start at step 305. The size of N_01 is 2, and the method proceeds to step 320 and then to step 330 where t(Z(N_01)) is found to be 1. In step 340, since t is equal to 1, then the method proceeds to step 350. In step 350, f1(R,x) is minimized when x=x*=3. Therefore in step 370, N_010 will contain node 203 with address string s=010 and N_011 will contain node 204 with address string s=011.

Similarly and independently, N_10 will be applied as input to method 300 recursively and will start at step 305. The size of N_10 is 2, and the method proceeds to step 320 and then to step 330 where t(Z(N_10)) is found to be 0. In step 340, since t is smaller than 1, then the method proceeds to step 350. In step 350, f1(R,x) is minimized when x=x*=5. Therefore in step 370, N_100 will contain node 205 with address string s=100 and N_101 will contain node 207 with address string s=101.

Similarly and independently, N_11 will now be applied as input to method 300 recursively and will start at step 305. The size of N_11 is 2, and the method proceeds to step 320 and then to step 330 where t(Z(N_11)) is found to be 3/2. In step 340, since t is greater than 1, then the method proceeds to step 360. In step 360, f2(R,y) is minimized when y=y*=3. Therefore in step 370, N_110 will contain node 206 with address string s=110 and N_111 will contain node 208 with address string s=111. Now, the third level of the hierarchy has been formed within network 200.

Now, since all third level partitioned nodes have size equal to 1, all independent threads of recursion of method 300 will terminate in step 390. The resulting address assignment shown in Table 2 below will be produced.

TABLE 2

| Node | Assigned Address String after Partitioning |
|---|---|
| 201 | 001 |
| 202 | 000 |
| 203 | 010 |
| 204 | 011 |
| 205 | 100 |
| 206 | 110 |
| 207 | 101 |
| 208 | 111 |

Additionally, a variant of the present invention can use coordinate rotation, for example, if the set of points to be partitioned lie roughly in an ellipse whose axes are not parallel to the x or y axes. This is easily accomplished by performing a linear regression, yielding an intercept b and slope m. The coordinates are then rotated using the usual formulae x'=x*cos(m)+y*sin(m) and y'=y*cos(m)−x*sin(m). Thus, the bounding outline can be any arbitrary shape.

Another variant of the present invention can define f1(R, x) in step 350 and f2(R,y) in step 360 as a function of bandwidth instead of as a function of the number of nodes within a rectangle R.

Furthermore, the present partitioning methods can be represented by one or more software applications (or even a combination of software and hardware, e.g., using application specific integrated circuits (ASIC)), where the software is loaded from a storage medium, (e.g., a ROM, a magnetic or optical drive or diskette) and operated by the CPU in the memory of a computer system. As such, the present partitioning methods and data structures of the present invention can be stored on a computer readable medium, e.g., RAM memory, ROM, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A recursive method for partitioning and assigning addresses based on geographic node locations in a network, comprising:

defining a smallest bounding outline that contains all nodes within the network;

partitioning said smallest bounding outline into two smaller bounding outlines divided according to an aspect ratio of said smallest bounding outline and assigning address bits to an address string of each of said two smaller bounding outlines; and recursively dividing each of said resulting smaller bounding outlines from said partitioning step until all smaller bounding outlines contain one node each.

2. The method of claim 1, wherein said smallest bounding outline is a smallest bounding rectangle expressed as:

$xL_0$=min of x(i) where {i in N}
$yL_0$=min of y(i) where {i in N}
$xH_0$=max of x(i) where {i in N}
$yH_0$=max of y(i) where {i in N} where N represents a set of nodes and x(i) and y(i) represent the x and y coordinates of the i-th node within the set N, where a rectangle Z(N) whose lower left corner is $(xL_0,yL_0)$ and whose upper right corner is $(xH_0, yH_0)$ is the smallest bounding rectangle that contains N.

3. The method of claim 2, wherein said aspect ratio, t, is expressed as follows:

$t(Z(N))=(yH_0-yL_0)/(xH_0-xL_0)$.

4. The method of claim 1, wherein said partitioning step comprises:

partitioning said bounding outline parallel to the y-axis, if said aspect ratio is smaller than or equal to one; and partitioning said bounding outline parallel to the y-axis, if said aspect ratio is greater than one.

5. The method of claim 4, wherein said partitioning step further comprising:

finding a value of x=x* such that the function $f1((Z(N),x))=|c1(Z(N),x)-size(N)/2|$ will be minimized, where c1(Z(N), x), defined over $[xL_0, xH_0]$, is the number of nodes in N that are contained in the outline whose lower left coordinate is $(xL_0, yL_0)$ and whose upper right coordinate is $(xL_0, yH_0)$.

6. The method of claim 4, wherein said partitioning step further comprising:

finding a value of y=y* such that the function $f2((Z(N),y))=|c2(Z(N),y)-size(N)/2|$ will be minimized, where c2(Z(N), y), defined over $[yL_0, yH_0]$, is the number of nodes in N that are contained in the outline whose lower left coordinate is $(xL_0, yL_0)$ and whose upper right coordinate is $(xH_0, y)$.

7. The method of claim 4, wherein one of said partitioning steps produces 2 smaller divided outlines, R_0 and R_1, where R_0 contains all nodes N_0 within the outline with lower left coordinates of $(xL_0, yL_0)$ and upper right coordinates of $(x*, yH_0)$ and R_1 contains all nodes N_1 within the outline with lower left coordinates of $(x*+1, yL_0)$ and upper right coordinates of $(xH_0, yH_0)$.

8. The method of claim 4, wherein one of said partitioning steps produces 2 smaller divided outlines, R_0 and R_1, where R_0 contains all nodes N_0 within the outline with lower left coordinates of $(xL_0, yL_0)$ and upper right coordinates of $(xH_0, y^*)$ and R_1 contains all nodes N_1 within the outline with lower left coordinates of $(xL_0, y^*+1)$ and upper right coordinates of $(xH_0, yH_0)$.

9. The method of claim 7, further comprising:
assigning a value of 0 to the most significant unassigned bit of the address string for R_0 and a value of 1 to the most significant unassigned bit of the address string for R_1.

10. The method of claim 8, further comprising:
assigning a value of 0 to the most significantly unassigned bit of the address string for R_0 and a value of 1 to the most significantly unassigned bit of the address string for R_1.

11. The method of claim 1, wherein said recursive dividing step will terminate if each of the bounding outlines contains only one node and wherein said addresses are AESA addresses.

12. An apparatus for partitioning and assigning addresses based on geographic node locations in a network, comprising:
means for defining a smallest bounding outline that contains all nodes within the network;
means for partitioning said smallest bounding outline into two smaller bounding outlines divided according to an aspect ratio of said smallest bounding outline and assigning address bits to an address string of each of said two smaller bounding outlines; and
means for recursively dividing each of said resulting smaller bounding outlines from said partitioning step until all smaller bounding outlines contain one node each.

13. The apparatus of claim 12, wherein said smallest bounding outline is a smallest bounding rectangle expressed as:

$xL_0$=min of x(i) where {i in N}
$yL_0$=min of y(i) where {i in N}
$xH_0$=max of x(i) where {i in N}
$yH_0$=max of y(i) where {i in N}
where N represents a set of nodes and x(i) and y(i) represent the x and y coordinates of the i-th node within the set N, where a rectangle Z(N) whose lower left corner is $(xL_0,yL_0)$ and whose upper right corner is $(xH_0, yH_0)$ is the smallest bounding rectangle that contains N.

14. The apparatus of claim 13, wherein said aspect ratio, t, is expressed as follows:

$t(Z(N))=(yH_0-yL_0)/(xH_0-xL_0)$.

15. The apparatus of claim 12, wherein said partitioning means partitions said bounding outline parallel to the y-axis, if said aspect ratio is smaller than or equal to one; and partitions said bounding outline parallel to the y-axis, if said aspect ratio is greater than one.

16. A computer-readable medium having stored thereon a plurality of instructions, the plurality of instructions including instructions which, when executed by a processor, cause the processor to perform the steps comprising of:
defining a smallest bounding outline that contains all nodes within the network;
partitioning said smallest bounding outline into two smaller bounding outlines divided according to an aspect ratio of said smallest bounding outline and assigning address bits to an address string of each of said two smaller bounding outlines; and
recursively dividing each of said resulting smaller bounding outlines from said partitioning step until all smaller bounding outlines contain one node each.

17. The computer-readable medium of claim 16, wherein said smallest bounding outline is a smallest bounding rectangle expressed as:

$xL_0$=min of x(i) where {i in N}
$yL_0$=min of y(i) where {i in N}
$xH_0$=max of x(i) where {i in N}
$yH_0$=max of y(i) where {i in N}
where N represents a set of nodes and x(i) and y(i) represent the x and y coordinates of the i-th node within the set N, where a rectangle Z(N) whose lower left corner is $(xL_0,yL_0)$ and whose upper right corner is $(xH_0, yH_0)$ is the smallest bounding rectangle that contains N.

18. The computer-readable medium of claim 17, wherein said aspect ratio, t, is expressed as follows:

$t(Z(N))=(yH_0-yL_0)/(xH_0-xL_0)$.

19. The computer-readable medium of claim 16, wherein said partitioning step comprises:
partitioning said bounding outline parallel to the y-axis, if said aspect ratio is smaller than or equal to one; and
partitioning said bounding outline parallel to the y-axis, if said aspect ratio is greater than one.

20. The computer-readable medium of claim 16, wherein said recursive dividing step will terminate if each of the bounding outlines contains only one node.

* * * * *